US012574565B1

(12) United States Patent
Segall et al.

(10) Patent No.: US 12,574,565 B1
(45) Date of Patent: Mar. 10, 2026

(54) SIGNALING FILM GRAIN RESOLUTION

(71) Applicant: Amazon Technologies, Inc., Seattle, WA (US)

(72) Inventors: Christopher Andrew Segall, Camas, WA (US); Byeongdoo Choi, Irvine, CA (US); Kiran Mukesh Misra, Camas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 18/541,838

(22) Filed: Dec. 15, 2023

(51) Int. Cl.
| | |
|---|---|
| *H04N 19/86* | (2014.01) |
| *H04N 19/132* | (2014.01) |
| *H04N 19/136* | (2014.01) |
| *H04N 19/172* | (2014.01) |
| *H04N 19/463* | (2014.01) |

(52) U.S. Cl.
CPC ........... *H04N 19/86* (2014.11); *H04N 19/132* (2014.11); *H04N 19/136* (2014.11); *H04N 19/172* (2014.11); *H04N 19/463* (2014.11)

(58) Field of Classification Search
CPC .... H04N 19/86; H04N 19/132; H04N 19/136; H04N 19/172; H04N 19/46
See application file for complete search history.

(56) References Cited

U.S. PATENT DOCUMENTS

2024/0312091 A1 * 9/2024 Tian ........................ G06T 11/60

FOREIGN PATENT DOCUMENTS

| | | | | | |
|---|---|---|---|---|---|
| CN | 117518577 A | * | 2/2024 | | |
| CN | 119205540 A | * | 12/2024 | | |
| CN | 119254969 A | * | 1/2025 | | |
| WO | WO-2022032010 A1 | * | 2/2022 | ........... | H04N 19/117 |
| WO | WO-2022073811 A1 | * | 4/2022 | ........... | H04N 19/117 |

OTHER PUBLICATIONS

De Rivaz, et al., "7.18.3. Film grain synthesis process," Excerpt from AV1 Bitstream & Decoding Process Specification, Jan. 8, 2019, 11 pages.

* cited by examiner

*Primary Examiner* — Tracy Y. Li
(74) *Attorney, Agent, or Firm* — Weaver Austin Villeneuve & Sampson LLP

(57) ABSTRACT

An encoder may signal a plurality of sets of film grain parameters for each frame of the video content, with each set of film grain parameters corresponding to one of the film grain resolutions. The encoder may also encode the video content into a coded bitstream with the plurality of sets of film grain parameters for each frame. The decoder may receive a coded bitstream comprising a frame of video content, and a set of film grain parameters for the frame. The decoder may decode the coded bitstream to generate a decoded frame at a decoder resolution. The post-processor may apply the set of film grain parameters to the decoded frame to generate an output frame containing film grains.

22 Claims, 10 Drawing Sheets

OBTAIN VIDEO CONTENT AT AN INPUT RESOLUTION
602

GENERATE A PLURALITY OF SETS OF FILM GRAIN PARAMETERS FOR A FRAME OF THE VIDEO CONTENT. AN INDIVIDUAL SET OF FILM GRAIN PARAMETERS CORRESPONDS TO ONE OF THE FILM GRAIN RESOLUTIONS
604

ENCODE THE VIDEO CONTENT WITH THE PLURALITY OF SETS OF FILM GRAIN PARAMETERS FOR THE FRAME INTO A CODED BITSTREAM
606

700

RECEIVE A CODED BITSTREAM COMPRISING A FRAME OF A VIDEO CONTENT, AND A SET OF FILM GRAIN PARAMETERS. THE SET OF FILM GRAIN PARAMETERS INCLUDES A FILM GRAIN RESOLUTION CORRESPONDING TO THE SET OF FILM GRAIN PARAMETERS
702

DECODE THE CODED BITSTREAM TO GENERATE A DECODED FRAME AT A DECODER RESOLUTION
704

SIGNALING FILM GRAIN RESOLUTION

BACKGROUND

Video compression systems may typically include video encoding, decoding, and post-processing operations. A video encoder may receive videos with one or more color channels as inputs, and generate a coded bitstream as an output. The video decoder may receive the coded bitstream as the input and generate a decoded video stream. The video post-processor may perform certain post-processing operations on the decoded video frame to enhance the fidelity of the decoded video frame for a display device.

BRIEF DESCRIPTION OF THE DRAWINGS

Various embodiments in accordance with the present disclosure will be described with reference to the drawings, in which:

FIG. 3 illustrates an example of a region in a video frame for modeling a film grain using Gaussian distribution;

DETAILED DESCRIPTION

Figure 1:
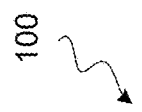
FIG. 1 illustrates an example of a high-level block diagram of a video system.
Figure 1:
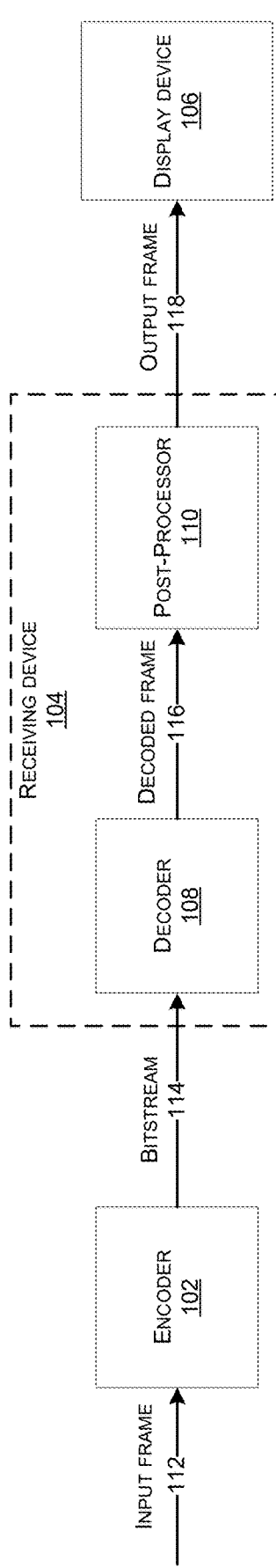

Video compression systems (or video codecs) may be used in various applications, e.g., video on-demand, Internet video, digital cable, among other examples. The video codecs may include hardware and software components to perform video encoding, decoding, and post-processing operations based on any suitable standard, e.g., H.264, HEVC, VVC, VP9, or AV1. A video encoder may receive frames of videos (or images, pictures, etc.) with one or more color channels as the input and generate a coded bitstream for transmission to a receiver comprising the video decoder and the post-processor. The video decoder may receive all or part of the coded bitstream and generate decoded frames. The post-processor may enhance the decoded frames to generate output frames for playback on a display device (e.g., TVs, computers, mobile devices, etc.). An example of a post-processing operation may include a film grain synthesis process to insert film grains in the decoded video frame to generate an output frame that contains the film grains for a more realistic visual appearance.

Film grain and/or camera noise (collectively called film grain in this specification) may appear in the video content due to the characteristics of the acquisition process. The film grain may be generally preserved to convey an artistic content for visually masking other artifacts in the content. However, film grain is difficult to compress efficiently due to its inherent random nature. In some implementations, film grain may be removed from the source video content before compression using a suitable de-noising process, and the film grain properties can be parameterized using estimations. The film grain parameters may be sent in a coded bitstream (or simply referred to as a bitstream) comprising the encoded video content. The video decoder may decode the coded bitstream to parse the film grain parameters from the encoded video content and generate a decoded frame. The post-processor may reconstruct the video content from the decoded frame and resynthesize the film grain based on the received film grain parameters.

The film grain parameters may generally depend on the spatial resolution of the film grain to be synthesized. However, the film grain resolution is typically not transmitted to the film grain synthesis process. In most cases, the film grain parameters that are sent with the bitstream match the resolution of the video content. For example, if the source video frame at the input to the encoder is at a 1080p resolution, the film grain parameters may also correspond to the 1080p resolution. As an example, the AV1 standard may include syntax for signaling the film grain parameters in the bitstream on a per-frame basis. However, some video codecs may change spatial resolutions on a per-frame basis. In such cases, it would be desirable to not apply the film grain parameters to a decoded frame that has a different resolution than the source video frame resolution. In some cases, it would also be desirable to apply the film grain synthesis at a consistent resolution as the decoder or display resolution.

Some video services may employ adaptive bit-rate streaming strategies that may allow the receiving devices to switch video resolutions throughout the playback. For example, some ultra-high density (UHD) applications may use a bit-rate ladder that includes 1080p, 720p, and 480p renditions for receiving devices using lower bit-rate connections. In such cases also, it would be visually desirable to apply the film grain synthesis at a consistent resolution during playback in certain applications.

The techniques described herein can be used to signal a film grain resolution corresponding to a set of film grain parameters with the encoded video content in a bitstream that can be used to apply film grain synthesis on a decoded frame. The decoder can decode the coded bitstream and parse the set of film grain parameters comprising the film grain resolution from the video content to generate the decoded frame. The set of film grain parameters can be applied to the decoded frame at or near the decoder resolution, and/or a display resolution associated with a display device to generate an output frame for playback on the display device. In some embodiments, syntax for signaling the film grain parameters can be modified to include an optional resolution flag to indicate whether to apply the decoder resolution for film grain synthesis. The resolution flag being set may indicate that the film grain parameters correspond to the decoded frame resolution. The resolution flag not being set may indicate that the film grain parameters correspond to a different resolution. In such scenarios, the horizontal film grain resolution and the vertical film grain resolution corresponding to the set of film grain parameters can be provided in the coded bitstream.

In some embodiments, different sets of film grain parameters can be generated at different film grain resolutions. The video content may be obtained at an input resolution. In some examples, the video content can be resampled at a plurality of film grain resolutions. The video encoder (or simply the encoder) may be operable to generate and signal a plurality of sets of film grain parameters, and each set of film grain parameters may comprise a corresponding film grain resolution from the plurality of film grain resolutions for each frame of the video content. In some embodiments, each set of film grain parameters may be generated by de-noising the video content and comparing the de-noised video content with the source video content to derive a Gaussian noise profile. Each set of film grain parameters may correspond to a different film grain resolution (e.g., 1080p, 720p, and 480p, etc.). A coded bitstream can be generated by encoding the video content corresponding to the input resolution, or by encoding the resampled video content corresponding to one of the plurality of film grain resolutions. In some embodiments, a parameter indicating how many sets of film grain parameters at different resolutions are being signaled by the encoder can also be transmitted with the plurality of sets of film grain parameters. As an example, the sets of film grain parameters can be transmitted to the receiver using the ITU-T T.35 signaling mechanism described in more detail below.

In various embodiments, the film grain resolution may be used to select the set of film grain parameters for inserting the film grains into the decoded frame. In some examples, the decoder resolution may be lower than the film grain resolution. In such cases, the decoded frame can be upsampled to the film grain resolution, and the film grains can be inserted into the upsampled decoded frame using the set of film grain parameters corresponding to the film grain resolution. In some examples, the film grain resolution may be the highest film grain resolution from the plurality of film grain resolutions, and can be determined using the vertical resolution or the horizontal resolution signaled in the set of film grain parameters.

In some examples, a set of film grain parameters having a film grain resolution that is closest to the decoder resolution (based on vertical and/or horizontal resolution), or is within a threshold difference to the decoder resolution (based on vertical and/or horizontal resolution), can be selected from the plurality of sets of film grain parameters. In some examples, when the decoder resolution is different than the film grain resolution, the set of film grain parameters can be interpolated to the decoder resolution, and the film grains can be inserted into the decoded frame using the interpolated set of film grain parameters. As an example, the set of film grain parameters can be resampled by interpolation of the autoregressive (AR) coefficients.

In some examples, a set of film grain parameters having a film grain resolution that is lower than a display resolution can be selected from the plurality of sets of film grain parameters. The set of film grain parameters may be upsampled or interpolated to the display resolution, and the decoded frame can be upsampled to the display resolution. The film grains can be inserted into the upsampled decoded frame using the upsampled or interpolated set of film grain parameters. In other examples, the decoded frame can be upsampled to the film grain resolution, and the film grains can be inserted into the upsampled decoded frame using the set of film grain parameters. The upsampled decoded frame containing the film grains can be further upsampled to the display resolution.

More generally, the techniques described herein can be used to signal the film grain resolution corresponding to the film grain parameters being sent to the decoder. In implementations that support film grain parameters generation at multiple resolutions, multiple sets of film grain parameters can be signaled with their corresponding film grain resolutions. By providing the film grain resolution information, the film grain synthesis process can select or interpolate the film grain parameters with the highest resolution matching the decoder resolution or the display resolution. Thus, film grain synthesis can be applied at a consistent resolution during the playback, providing a visually desirable customer experience. By providing the film grain resolution, the film grain synthesis can also be applied at various resolutions to support switching of the resolutions during the video playback.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a high-level block diagram of a video system 100. The video system 100 may include an encoder 102, a receiving device 104, and a display device 106. The receiving device 104 may include a decoder 108 and a post-processor 110. The encoder 102 and the receiving device 104 can be part of a film grain synthesis system that can be used in various applications, e.g., video on-demand, Internet video, digital cable, DVD players, among other examples, based on any suitable standard, e.g., H.264, HEVC, VVC, VP9, or AV1.

The encoder 102 may encode video content for streaming or delivery to the receiving device 104. In some implementations, the video content can be stored in a server, and can be streamed to a receiving device upon request. To generate the encoded video content, the encoder 102 may be operable to receive input frames 112 corresponding to a source video content (or images). In most cases, the video content may include film grain due to the characteristics of the acquisition process (e.g., camera sensors), or as part of the creative intent of the content creators, and may need to be preserved. However, the film grain may be difficult to compress efficiently due to the inherent random nature of the film grain.

The encoder 102 may be further operable to remove the film grain from the video content using a suitable de-noising method and estimate the film grain parameters on a per-frame basis. Generally, film grain in the video contents or images may follow a Gaussian distribution. In some implementations, the encoder 102 may generate a set of film grain parameters by comparing the denoised video content with the input video content to derive a Gaussian noise profile. In some implementations, an autoregressive (AR) process can be used to model the set of film grain parameters corresponding to a film grain resolution for each input frame. In some cases, the video content may lack native film grains, and the encoder 102 may generate a set of film grain parameters based on the film grain properties associated with synthetic noise. These set of film grain parameters can be used to insert the synthetic noise in the decoded frame for playback.

The encoder 102 may be further operable to encode the video content into a coded bitstream of the video content. Generally, the input frames 112 may be received at a source frame resolution; however, in order to support different bitrates/resolutions the video content may be resampled at different frame resolutions. Thus, the encoder 102 may be capable to signal the encoded video content at different bitrates/resolutions to support different decoders with varying capabilities and network bandwidth. Additionally, some encoders may support adaptive bitrate streaming to allow switching the resolution at the receiving end during playback. For example, in some cases, the receiving device 104 may switch to a lower bitrate/resolution due to power constraints or resource constraints. In such cases, if the decoder resolution is lower than the film grain resolution corresponding to the set of film grain parameters signaled by the encoder 102, the receiving device 104 may upsample the decoded frame to the film grain resolution before applying the film grain synthesis.

The embodiments can be used to decouple the film grain resolution from the resolution of the underlying video frame by signaling the film grain resolution in the set of film grain parameters along with the encoded video content in the bitstream 114. The film grain resolution may be provided in the set of film grain parameters as a horizontal film grain resolution and/or a vertical film grain resolution. In some embodiments, the set of film grain parameters may also include an optional resolution flag to indicate the presence of the film grain resolution in the set of film grain parameters. The film grain parameters can be signaled and controlled on a per-frame basis. This may include signaling that enables or disables the film grain process for the current frame, and/or signaling if the film grain parameters are explicitly transmitted with the current frame or deferred from previously signaled film grain parameters. The encoder 102 may also signal the frame resolution of the video content in the bitstream 114. The frame resolution being signaled may be the same or different resolution than the film grain resolution indicated in the set of film grain parameters.

Some embodiments can be used to signal different film grain resolutions associated with corresponding sets of film grain parameters per frame in the bit stream 114 to provide support for the adaptive bitrate streaming, or playback of the transmitted video content on the display device 106 at different resolutions. For example, the encoder 102 may obtain the video content at an input resolution, and resample the video content at a plurality of film grain resolutions. The encoder 102 may be further operable to generate a plurality of sets of film grain parameters for each frame of the video content with each set of film grain parameters corresponding to one of the film grain resolutions. The encoder 102 may be further operable to transmit, for each frame, the plurality of sets of film grain parameters in the bitstream 114 comprising the encoded video content to the receiving device 104.

Each set of film grain parameters may include an optional resolution flag to indicate presence of the film grain resolution in the corresponding set of film grain parameters. The film grain resolution may be provided in each set of film grain parameters as a horizontal film grain resolution and a vertical film grain resolution. In some embodiments, transmitting the plurality of sets of film grain parameters to the receiving device 104 may also include transmitting a parameter indicating the number of sets of film grain parameters in the bitstream 114. An example of a block diagram for an encoder is described with reference to FIG. 2.

The receiving device 104 may be operable to receive the bitstream 114 using a suitable communication medium (e.g., the network, cable, etc.). The bitstream 114 may comprise a frame of the transmitted video content, a frame resolution, and one or more sets of film grain parameters including a corresponding film grain resolution for the frame. The decoder 108 may be further operable to decode the bitstream 114 to parse the encoded video content and the frame resolution from the one or more sets of film grain parameters for the frame. For example, the decoder 108 may extract the one or more sets of film grain parameters for the frame, and generate a decoded frame 116 from the encoded video content. The decoded frame 116 may correspond to a decoder resolution, which may or may not change per frame, and may be the same or different than the one or more film grain resolutions provided in the corresponding one or more sets of film grain parameters. An example of a block diagram for a decoder is described with reference to FIG. 4.

The decoded frame 116 may be received by the post-processor 110. The post-processor 110 may be operable to perform the film grain synthesis operation by applying the set of film grain parameters to the decoded frame 116 to generate an output frame 118 that contains the film grains. In various embodiments, the film grain resolution may be used to select the set of film grain parameters for inserting the film grains into the decoded frame 116. The film grain resolution may be selected by the post-processor 110 from the plurality of film grain resolutions provided by the encoder 102 in the bitstream 114 based on the decoder resolution, and/or a display resolution for the display device 106.

In some examples, when the resolution of the decoded frame 116 and the film grain resolution associated with one of the sets of film grain parameters are equal, the film grain synthesis process may be performed on the decoded frame 116 to generate the output frame 118. In other examples, when the resolution of the decoded frame 116 is substantially similar to a film grain resolution associated with one of the sets of film grain parameters from the plurality of sets of film grain parameters provided in the bitstream 114, the set of film grain parameters associated with the substantially similar film grain resolution may be used for the film grain synthesis process. As an example, two resolutions that are within a threshold difference to each other (e.g., within 5%, 10%, 15%, etc., or a predefined range) may be considered substantially similar to each other, or closest to each other. The threshold difference may be in the horizontal direction and/or in the vertical direction.

In another example, when the resolution of the decoded frame 116 and the transmitted film grain resolution are not equal, the decoded frame 116 may be first upsampled to the transmitted film grain resolution. The film grain synthesis may then be applied to the upsampled decoded frame 116. In some examples, this film grain synthesis may be applied if the resolution of the decoded frame 116 is less than the transmitted film grain resolution in one or more dimensions.

In another example, when the resolution of the decoded frame 116 is substantially similar to the film grain resolution associated with one of the sets of film grain parameters, the set of film grain parameters associated with the substantially similar film grain resolution may be used to perform the film grain synthesis process without upsampling the decoded frame 116.

In another example, when the resolution of the decoded frame 116 and the transmitted film grain resolution are not equal, the film grain parameters in the set may be resampled to the resolution of the decoded frame 116. The film grain synthesis process may be performed on the decoded frame 116 using the resampled film grain synthesis parameters. In another example, the film grain synthesis parameters may be resampled by interpolating the AR coefficients.

In another example, the receiving device 104 may be operable to support a defined number of film grain resolutions. The post-processor 110 may be operable to select a set of film grain parameters associated with one of the defined film grain resolutions. The post-processor 110 may upsample the decoded frame 116 to the resolution associated with the set of film grain parameters. The selected film grain parameters can then be used to perform the film grain synthesis on the upsampled decoded frame 116. In yet another example, the post-processor 110 may select the set of film grain parameters associated with one of the defined film grain resolutions having the highest resolution. The highest resolution may be determined by the horizontal resolution, or by the vertical resolution.

In another example, the display resolution associated with the display device 106 may be determined, and the decoded frame 116 may be upsampled to the display resolution. The film grain synthesis process can be applied using the set of film grain parameters associated with the display resolution and the upsampled decoded frame.

In another example, display resolution associated with the display device 106 may be determined, and the set of film grain parameters associated with a film grain resolution that is similar to the display resolution can be determined. The decoded frame 116 may then be upsampled to the similar film grain resolution, and the film grain synthesis process can be performed using the set of film grain parameters associated with the similar resolution and the upsampled decoded frame. The result may then be upsampled to the display resolution. In another example, the similar resolution may be less than the display resolution in one or more dimensions. In various embodiments, to define the scope of the similar resolution, the encoder 102 may be operable to explicitly signal a range of the similar film grain resolutions in the bitstream 114 that can allow the film grain synthesis process with the given set of film grain parameters, or the decoder 108 may be operable to choose the similar film grain resolution from the plurality of film grain resolutions.

In another example, display resolution associated with the display device 106 may be determined. The film grain parameters associated with a resolution that is similar to the display resolution can be determined. The film grain parameters associated with the similar resolution may be then resampled to the display resolution, and the decoded image may be upsampled to the display resolution. The film grain synthesis process can be applied using the resampled film grain parameters associated with the similar resolution and the upsampled decoded frame. In another example, the film grain synthesis parameters may be resampled by interpolation of the AR coefficients.

Figure 2:
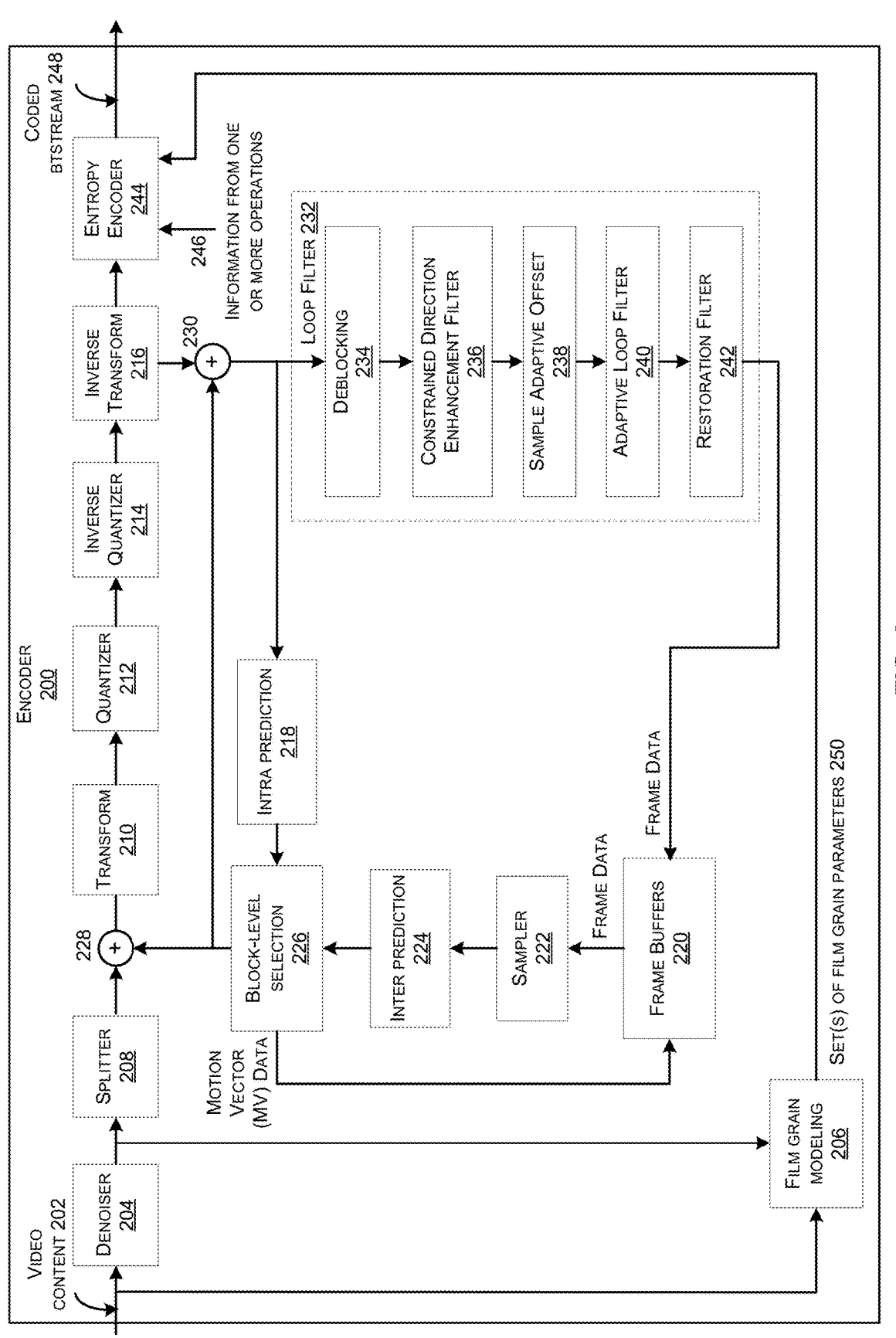
FIG. 2 illustrates an example of a block diagram of an encoder, in some embodiments.

FIG. 2 illustrates an example of a block diagram of an encoder 200, in some embodiments. The encoder 200 can be an example of the encoder 102 in FIG. 1. Different components of the encoder 200 may be implemented using hardware, software, or a combination thereof.

The encoder 200 may be operable to receive input frames for a video content 202 that may include film grain, as described previously. A denoiser module 204 may be operable to remove the film grain using a suitable denoising process, e.g., spatial video denoising, temporal video denoising, spatial-temporal video denoising, etc. In most cases, denoising may be performed for both chroma and luminance components. The denoised video content may be provided to a film grain modeling module 206 and a splitter module 208.

The film grain modeling module 206 may be operable to estimate one or more sets of film grain parameters 250 associated with the frame based on the film grain properties extracted from the denoising process performed by the denoiser module 204. In some implementations, an autoregressive (AR) process can be used to model the film grain pattern, as shown in FIG. 3.

Figure 3:
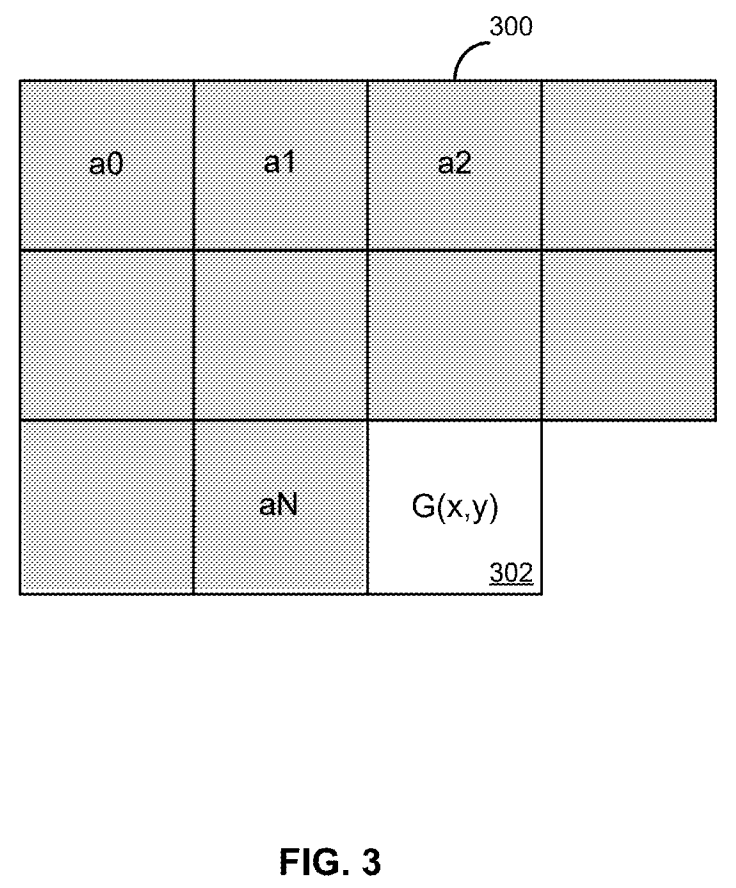

FIG. 3 illustrates an example of a region 300 in a video frame for modeling a film grain using Gaussian distribution. Each square of the region 300 may represent a pixel of the frame. In some implementations, a value of a current film grain sample at a position (x,y) indicated by a square 302 can be modeled as a weighted sum of the previous gain values in a 2D casual neighborhood (indicated by shaded squares) and a Gaussian noise sample.

In some embodiments, a set of film grain parameters can be generated by estimating the AR coefficients, (e.g., $a_0$, $a_1$, $a_2$, . . . , $a_N$) in a following equation (Eqn) 1:

$$G(x,y)=a_0*G(x-2,y-2)+a_1*G(x-1,y-1)+a_2*G(x,y-2)+ \ . \ . \ .+z, \qquad \text{Eqn (1)}$$

where $G(x, y)$ is a zero-mean normalized grain sample at the position (x, y), and z is a unit variance pseudo-random Gaussian noise. As an example, the set of film grain parameters can be generated by solving Eqn (1) for the model parameters (e.g., $a_0$, $a_1$, $a_2$, . . . , $a_N$) that best fit the distribution of the noise that was removed. However, other implementations of estimating the noise and generating the set of film grain parameters are possible, without deviating from the scope of the disclosure.

Referring back to FIG. 2, in some embodiments, the film grain modeling module 206 may be operable to generate the one or more sets of film grain parameters 250 for each (e.g., an individual) frame of the video content 202. Each set of film grain parameters for the frame may correspond to one of the film grain resolutions. For example, the video content 202 may be resampled at different film grain resolutions before arriving at the denoiser 204, and the resampled video content corresponding to each film grain resolution may be provided to the film grain modeling module 206 and the splitter module 208. Thus, the film grain modeling module 206 may be operable to generate multiple sets of film grain parameters, each set of film grain parameters 250 corresponding to a different film grain resolution.

In some embodiments, the video content 202 provided to the encoder 200 may not include film grain. In this case, the film grain modeling module 206 may receive film grain properties associated with synthetic noise to generate the one or more sets of film grain parameters 250 for each frame of the video content 202 that can be used to insert the synthetic noise in the decoded frame at the receiver. In some implementations, the film grain modeling module 206 may create a noise template using the AR model based on the received film grain properties, and generate the one or more sets of film grain parameters 250 based on the noise template.

In some embodiments, the film grain modeling module 206 may be operable to provide an optional resolution flag to indicate presence of the film grain resolution in the corresponding set of film grain parameters 250. The film grain resolution may be provided in the corresponding set of film grain parameters as a horizontal film grain resolution and a vertical film grain resolution. An example film grain parameters syntax that can be used to signal the set of film grain parameters including the resolution flag is shown in Table 1 below:

```
afgs_film_grain_params( ) {                   Type
apply_grain                                   f(1)
...
...
apply_decoder_resolution_flag                 f(1)
if(!apply_decoder_resolution_flag) {
    apply_horz_resolution                     f(16)
    apply_vert_resolution                     f(16)
}
...
}
```

As shown in the example of Table 1 above, an apply_decoder_resolution_flag being 0 in the set of film grain parameters 250 may indicate that the set of film grain parameters 250 for the current frame includes a horizontal film grain resolution indicated by the apply_horz_resolution parameter, and a vertical film grain resolution indicated by the apply_vert_resolution parameter. Additionally, an apply_decoder_resolution flag being 1 in the set of film grain parameters 250 may indicate that the film grain parameters used for applying the film grain synthesis on the decoded frame 116 correspond to the decoded frame resolution. In some implementations, the apply_decoder_resolution_flag may be absent, and the apply_horz_resolution parameter would correspond to the horizontal film grain resolution, and the apply_vert_resolution parameter would correspond to the vertical film grain resolution in the set of film grain parameters 250.

An alternative example film grain parameters syntax that can be used to signal the set of film grain parameters is shown in Table 2 below:

```
afgs_film_grain_params( ) {                   Type
apply_grain                                   f(1)
...
...
apply_units_resolution_log2                   f(4)
    apply_horz_resolution                     f(12)
```

-continued

```
    apply_vert_resolution                     f(12)
    ...
    ...
}
```

In Table 2 above, the set of film grain parameters 250 for the current frame includes a horizontal film grain resolution indicated by an apply_horz_resolution parameter, a vertical film grain resolution indicated by an apply_vert_resolution parameter, and an apply_units_resolution_log 2 parameter. In one example, the horizontal film grain resolution may be determined by the operation apply_horz_resolution<<apply_units_resolution_log 2, the vertical film grain resolution may be determined by the operation apply_vert_resolution<<apply_units_resolution_log 2, where <<denotes a left shift operation.

As an alternative example, the horizontal film grain resolution may be determined by the operation:

$$apply\_horz\_resolution * 2^{apply\_units\_resolution\_log\ 2},$$

and the vertical film grain resolution may be determined by the operation:

$$apply\_vert\_resolution * 2^{apply\_units\_resolution\_log\ 2}.$$

In a specific example, the horizontal film grain resolution is determined to be 1920 when apply_horz_resolution is equal to 480 and apply_units_resolution_log 2 is equal to 2.

Yet another example film grain parameters syntax that can be used to signal the set of film grain parameters is shown in Table 3 below:

```
afgs_film_grain_params( ) {                   Type
apply_grain                                   f(1)
...
...
num_bits                                      f(4)
    apply_horz_resolution                     f(num_bits)
    apply_vert_resolution                     f(num_bits)
...
...
}
```

In Table 3 above, the set of film grain parameters 250 for the current frame includes a horizontal film grain resolution indicated by an apply_horz_resolution parameter and a vertical film grain resolution indicated by an apply_vert_resolution parameter. The number of bits used to indicate the apply_horz_resolution parameter and the apply_vert_resolution parameter is indicated in the bitstream with the num_bits parameter.

In some embodiments, the plurality of sets of film grain parameters 250 can be signaled using the ITU T.35 signaling mechanism (published by the International Telecommunication Union Telecommunication Standardization Sector), as shown in the example of Table 4 below:

```
afgs_itu_t35_payload( ) {                                           Type
    itu_t_35_terminal_provider_oriented_code                        f(16)
    if (itu_t_35_terminal_provider_oriented_code == 0x0001) {
        afgs_film_grain_params( )
    }
}
```

In Table 4, itu_t_35_terminal_provider_oriented_code may indicate the value of the ITU-T T.35 terminal provider oriented code that is defined in the AOMedia metadata registry specification. As an example, a value of 0x0001 for the parameter itu_t_35_terminal provider_oriented_code may indicate that the ITU-T T.35 payload contains film grain parameters. However, other signaling mechanisms to send the afgs_film grain_params( ) syntax are possible besides the ITU T.35 payload, without deviating from the scope of the disclosure.

In Table 5, num_film grain sets_minus1 added with 1 may indicate the number of sets of film grain parameters being signaled:

```
afgs_film_grain_params_sets( ) {              Type
    num_film_grain_sets_minus1                f(3)
```

-continued

```
for (i=0; i< num_film grain_sets_minus1; i++) {
    afgs_film_grain_params( )
    }
}
```

The splitter module 208 may be operable to split each frame into spatial regions for coding. These spatial regions may be referred to as macro-blocks, super-blocks, or coding tree units. The splitter module 208 may further partition the spatial regions. For example, each super-block in AV1 may be recursively split into coding blocks ranging in size from 128×128 samples to 4×4 samples with both square and rectangular shapes. Furthermore, the splitter module 208 may also combine the spatial regions into larger spatial regions referred to as tiles, or slices. The recursive splitting and combining may be performed jointly or independently for the color channels. As an example, a sample (or pixel) may correspond to a specific location within a frame and color channel. For two-dimensional images, this specific location may be a horizontal and vertical index into the color channel of the frame, which may store the value for the image at that index.

Each coding block may be first predicted using either intra frame prediction, inter frame prediction or a combination of the predictions. An intra prediction module 218 may be operable to predict a current coding block from previously coded and spatially neighboring blocks. This prediction may be done with directional intra prediction that may predict the sample values of the current coding block by extrapolating previously coded information along a prediction direction. The prediction may also be done with non-directional intra-prediction, such as non-directional smooth intra-prediction, recursive intra-prediction, intra-block copy and color palette techniques.

An inter prediction module 224 may be operable to use information from previously coded frames for predictions that are stored in one or more frame buffers 220. In some implementations, a translational motion model can be used for performing this prediction. In this approach, the spatial offsets (or motion vectors) between the current coding block and a previously decoded frame can be used to translate a region of the previously coded frame, and may use the translated version for prediction. Different precisions for the motion vectors may be possible, such as ⅛ pixel motion vector accuracy. Additionally, different interpolation filters may also be selected. In addition to a translational motion approach, alternative methods (or prediction models) for performing inter frame prediction, such as, affine motion compensation or overlapped block motion compensation, can be used. Moreover, one or more of these models may be able to predict the current coding block from more than one previously coded locations in previously decoded frames, e.g., similar to the compound prediction mode in AV1. In some implementations, more than one prediction may be combined by computing a weighted average based on the temporal distance between each previously coded block and the current coded block. In the case that the previously coded frame is a different resolution than the input frame, a sampler module 222 may be used to optionally convert the spatial resolution of a previously coded frame.

In some implementations, a block-level selection module 226 may be operable to use a combination of intra-frame and inter-frame prediction for a current coded block. For example, a coding block may be divided into two regions. The first region may be predicted using an intra-frame prediction method performed by the intra-prediction module 218, and the second region may be predicted using an inter-frame prediction region predicted by the inter-prediction module 224. In some implementations, an intra-frame prediction and an inter-frame prediction may be averaged to predict the current coding block.

Following the prediction of each block, residual information may be added to the prediction by an adder 228. A difference between the prediction and the original frame data may be calculated, and an optional transform to the difference may be applied by a transform module 210. A quantizer module 212 may be operable to quantize the coefficients that are output by the transform module 210. An inverse quantizer module 214 may be operable to de-quantize the quantized coefficients computed by the quantizer 212. An inverse transform module 216 may be operable to apply an optional inverse transform to the de-quantized coefficients. The result of the inverse transform can be added to the predicted block using an adder 230 to compute the residual. In some cases, the sequential process of quantization and de-quantization may not result in the same output as the input that was provided to the quantization process. Similarly, the sequential process of a transform followed by an inverse transform may not result in the same output as the input that was provided to the transform.

The reconstructed block corresponding to the addition of the prediction and residual information may then be processed by one or more in-loop filters (or operations) 232. The loop filters 232 may improve the fidelity of reconstructed blocks and include processes such as deblocking filters 234, constrained directional enhancement filter 236, sample adaptive offset filters 238, adaptive loop filters 240, and loop restoration filters 242. These operations may use different partitioning than the reconstructed blocks.

The output of the one or more loop filters 232 comprising frame data may be stored in the frame buffer 220 (or decoded picture buffer) to be used by the inter prediction module 224 in the inter prediction of coding blocks in different frames. In some implementations, the frame data generated by the restoration filter 242 may also be used by the film grain modeling module 206 to generate the sets of film grain parameters 250. In some implementations, the output may be processed by post-processing filters (or operations) to further modify the output by, e.g., spatial resizing, color conversion, film grain synthesis, and debanding operations, which are not shown in FIG. 2.

Information computed during the encoding process may be signaled in a bitstream. For example, partitioning of the regions for coding, intra prediction directions, motion vectors, quantized transform coefficients and in-loop filter control information maybe signaled based on information 246 provided by the one or more of these operations. An entropy encoder 244 may be used to generate a coded bitstream 248 without loss using an entropy coding system based on the information 246. For example, in the case of the AV1 standard (published by Alliance for Open Media), the entropy coding system may use an M-ary arithmetic coder. In the case of the VVC standard (published by the Joint Video Experts Team), the entropy coding system may use a context-adaptive binary arithmetic coder. The coded bitstream 248 may also include the sets of film grain parameters 250 comprising the corresponding film grain resolutions, the frame resolution of the video content 202, and any other relevant information that can be used to perform film grain synthesis. The frame resolution of the video content 202 may or may not be the same as any of the film grain resolutions provided in the set of film grain parameters. The information 246, sets of film grain parameters 250, and the encoded video content may be extracted from the coded bitstream 248 by the decoder 108.

In some implementations, the film grain modeling module 206 may create a noise template using a frequency transform process. For example, the denoiser 204 can extract the film grain from the video content as a noise image. The noise image can be coded using the transform module 210, quantizer module 212, and the entropy encoder module 244, and can be provided in the sets of parameters 250 in the coded bitstream 248.

In some implementations, the coded bitstream 248 containing the sets of film grain parameters 250 and the encoded video content may be packetized into one or more container units. In one example, the bitstream 248 may be packetized into Open Bitstream Units (OBUs). In another example, the bitstream 248 may be packetized into Network Abstraction Layer Units (NALUs). The packetized containers may have different types, such as frame packet types, sequence header packet types, frame header packet types, metadata packet types, temporal delimiter packet types, tile group packet types, and frame header packet types.

In some implementations, the encoder 200 may include an encapsulator module (not shown) to encapsulate the coded bit stream 248 using a suitable container format to generate an encapsulated bitstream. In other implementations, the entropy encoder 244 may generate the coded bitstream 248 without the sets of film grain parameters 250, and the coded bitstream 248 can be encapsulated with the sets of film grain parameters 250 to generate the encapsulated bitstream. The encapsulated bitstream can be decapsulated by the decoder to retrieve the coded bitstream 248.

Figure 4:
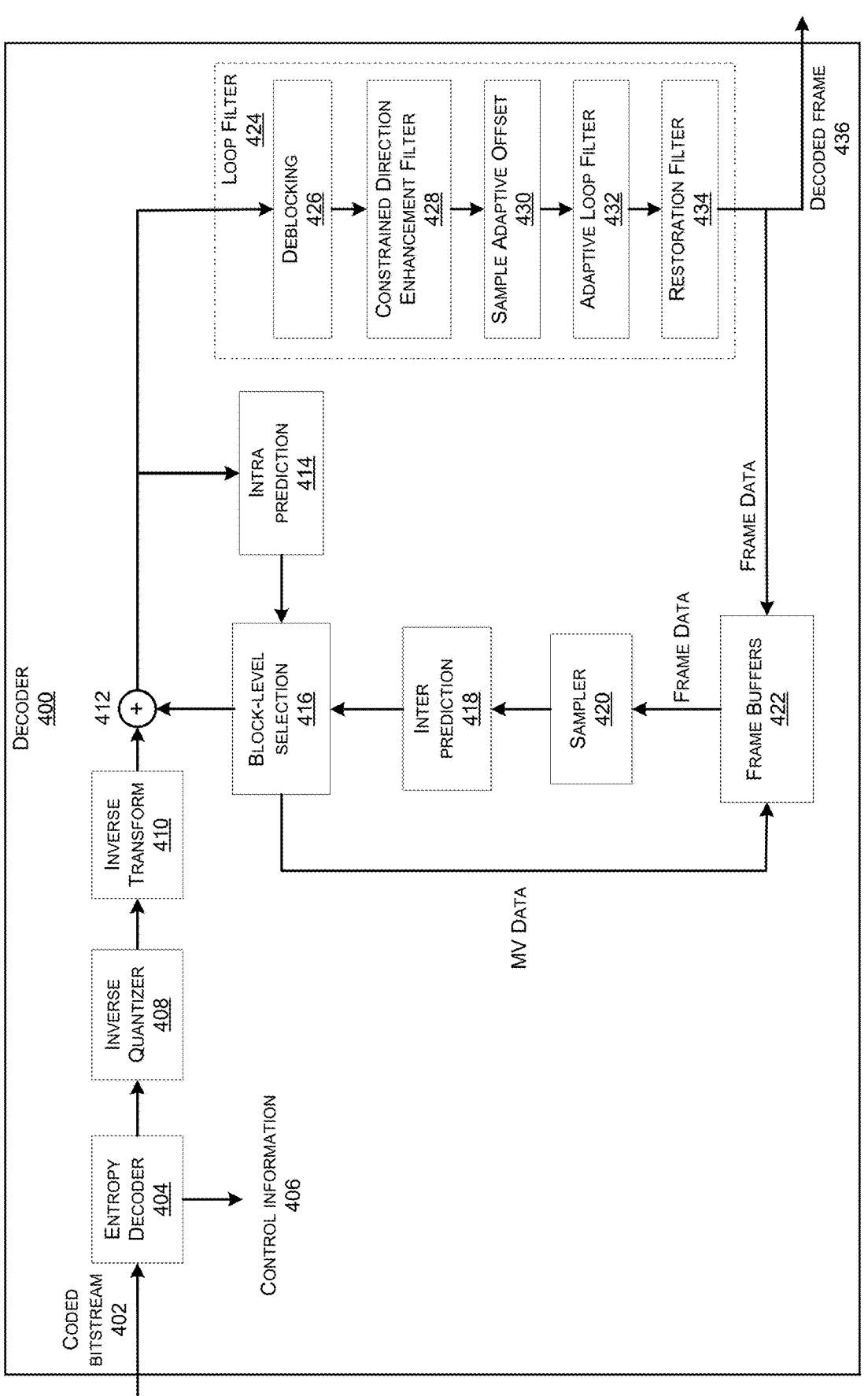
FIG. 4 illustrates an example of a block diagram of a decoder, in some embodiments.

FIG. 4 illustrates an example of a block diagram of a decoder 400. The decoder 400 can be an example of the decoder 108 in FIG. 1. Different components of the decoder 400 may be implemented using hardware, software, or a combination thereof.

The decoder 400 may obtain a coded bitstream 402 transmitted by the encoder 200. For example, the coded bitstream 402 may include the coded bitstream 248 containing the one or more sets of film grain parameters 250. An entropy decoder 404 may be operable to decode the coded bitstream 402 and generate quantized coefficients as the output, and control information 406 that can be used by other operations within the decoder 400 and for post-processing operations. For example, the control information 406 may include the information 246 generated by the encoding process, the one or more sets of film grain parameters 250, and a decoder resolution corresponding to the decoded frame 436, among other information. In some implementations, if the coded bitstream 402 was encapsulated, a decapsulator may be used before the entropy decoder 404, and the entropy decoder 404 may operate on the output of the decapsulator to generate the quantized coefficients, and the control information 406.

The quantized coefficients generated by the entropy decoder 404 can be inverse quantized by an inverse quantizer module 408, and (optionally) inverse transformed by an inverse transform module 410 to generate a residual. The residual may be added by an adder 412 to a block-level prediction that is generated by an intra prediction, inter prediction, or combined prediction process. For example, outputs from an intra prediction module 414 and an inter prediction module 418 can be used by a block-level selection module 416 to generate the block-level prediction. The intra prediction module 414, the inter prediction module 418, and the block-level selection module 416 may be similar to the intra prediction module 218, the inter prediction module 224, and the block-level selection module 226 of the encoder 200, respectively.

The resulting sample values from the adder 412 may be processed by a loop filter 424. For example, the loop filter 424 may be operable to perform loop filter operations that may include deblocking 426, constrained direction enhancement filter 428, sample adaptive offset 430, adaptive loop filter 432, and a restoration filter 434. The output of the loop filter 424 may be stored in one or more frame buffers 422 to be used by the inter prediction process, and is also provided as an output of the decoder 400 representing a decoded frame 436. In some examples, when the data stored in the frame buffer 422 does not have the same spatial resolution as a current frame, the data stored in the frame buffer 422 may be resampled by the inter prediction process using a sampler module 420 to the same resolution as the current frame. The sampler module 420 may be similar to the sampler module 222 of the encoder 200.

In some implementations, a noise template can be signaled explicitly as image data. In such implementations, the entropy decoder 404, the inverse quantizer 408, and the inverse transform 410 can be used to decode the image data to recreate the noise template. The noise template can then be combined with the decoded frame 436 by the post processor 110 to generate an output frame that contains the film grains.

Figure 5A:
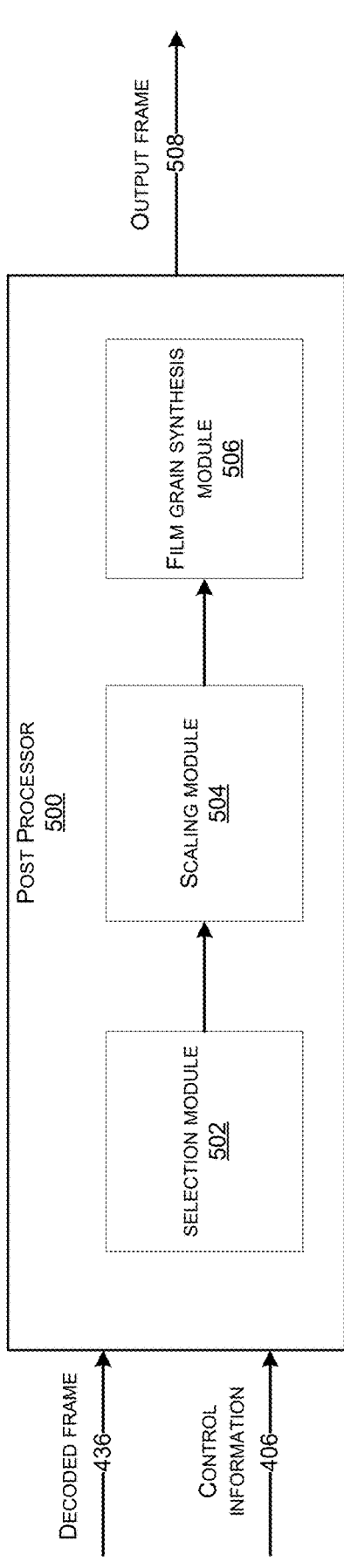
FIG. 5A illustrates an example of a post-processor that can be used to perform film grain synthesis, according to some embodiments.

FIG. 5A illustrates an example of a post-processor 500 that can be used to perform film grain synthesis, according to some embodiments. The post-processor 500 can be an example of the post-processor 110 in FIG. 1. Different components of the post-processor 500 may be implemented using hardware, software, or a combination thereof.

The post-processor 500 may include a selection module 502, a scaling module 504, and a film grain synthesis module 506. The post-processor 500 may receive the decoded frames 436 and the control information 406 from the decoder 400. The post-processor 500 may be operable to enhance and/or improve the fidelity of the decoded frame 436 by reconstructing the video content and resynthesizing the film grain based on the control information 406. For example, the control information 406 may include the one or more sets of film grain parameters 250 transmitted by the encoder 200. As described with reference to Table 1, each set of film grain parameters may include a resolution flag to indicate presence of the film grain resolution in the set of film grain parameters, and the film grain resolution may be provided in the set of film grain parameters as a horizontal film grain resolution and a vertical film grain resolution. The control information 406 may also include a decoder resolution corresponding to the decoded frame 436.

The selection module 502 may be operable to select a film grain resolution or a set of film grain parameters that may be used by the film grain synthesis module 506 to perform the film grain synthesis operation on the decoded frame 436 to generate an output frame 508. In various examples, the selection module 502 may select a film grain resolution based on a plurality of film grain resolutions corresponding to a plurality of sets of film grain parameters, the decoder resolution, and/or the display resolution. In some examples, the selection module 502 may select a film grain resolution that has a highest resolution from the plurality of film grain resolutions. The highest resolution may be determined using the horizontal resolution or the vertical resolution provided in the corresponding set of film grain parameters. In some examples, the selection module 502 may select a film grain resolution that is same as, or is closest to, the decoder resolution. In some examples, the selection module 502 may select a film grain resolution that is substantially similar to the decoder resolution, e.g., is within a threshold difference (e.g., 5%, 10%, 15%, etc. or a predefined range) to the decoder resolution. In some examples, the selection module 502 may select a film grain resolution that is same as the display resolution. In some examples, the selection module 502 may select a film grain resolution that is similar to the display resolution. For example, the film grain resolution may be slightly lower than the display resolution in one or more dimensions.

The scaling module 504 may be operable to upsample or downsample the decoded frame 436 from a decoder resolution to a different resolution. In various examples, the scaling module 504 may upsample the decoded frame 436 to a selected film grain resolution when the decoder resolution is lower than the selected film grain resolution, or to the display resolution when the decoder resolution is lower than the display resolution. In some embodiments, the scaling module 504 may also be operable to resample a set of film grain parameters to a different resolution, and generate an interpolated set of film grain parameters. In some examples, the scaling module 504 may interpolate a selected set of film grain parameters to the display resolution when the selected film grain resolution is lower than, or substantially similar to, the display resolution. In some examples, the scaling module 504 may interpolate a selected set of film grain parameters to the display resolution when the selected film grain resolution is different than the display resolution. In some implementations, the selected set of film grain parameters can be resampled by interpolation of the AR coefficients. For example, the set of film grain parameters may include the film grain resolution of 480p, and can be resampled to the 720p display resolution using interpolation.

The film grain synthesis operation 506 may be operable to insert the film grains into the decoded frame 436 using a set of film grain parameters determined by the selection module 502 and/or the scaling module 504. For example, the set of film grain parameters may be selected by the selection module 502 from the plurality of sets of film grain parameters, or may include resampled set of film grain parameters generated by the scaling module 504. In various implementations, the post processor 500 may include additional modules and/or functionality based on the type of the receiving device 104, or the video codec standard(s) supported by the receiving device 104. For example, some implementations may include additional processing between the selection module 502 and the scaling module 504, and/or between the scaling module 504 and the film grain synthesis module 506, which are not described herein.

In some implementations, film grain synthesis may be performed using an AR model, as described in the Alliance for Open Media AV1 standard. As described with reference to FIG. 3 and Eqn (1), the value of a current grain sample represented by the square 302 can be modeled as a weighted sum of the previous grain values in a 2D causal neighborhood (shaded squares) and a Gaussian noise sample.

In most cases, amplitude of the film grain may also depend on the intensity of the underlying signal. In one film grain example, the G(x, y) can be multiplied by a film grain strength parameter. The film grain strength parameter may be expressed as a piece-wise linear function for the Y, Cb and Cr color components. When adding film grain to the luma component, the output video frame 508 may be described as:

$$Y'(x,y)=Y(x,y)+f(Y((x,y))*G_Y(x,y)), \qquad \text{Eqn (2)}$$

where Y(x, y) is the luma value at location (x, y) in an image, f(L) is film grain strength parameter for value L, and Y'(x, y) is the luma value at location (x, y) in the image containing synthesized film grain.

The output value for the Cb and Cr color components can be computed as:

$$C'(x,y)=C(x,y)+f(C((x,y))*G_C(x,y), \qquad \text{Eqn (3)}$$

where C may denote one of Cb or Cr, C(x, y) can be a chroma value location (x, y) in an image, f(C) can be a film grain strength parameter for value c, and C'(x, y) can be the chroma value at location (x, y) in an image containing synthesized film grain. The variable c may correspond to both the C and luma components of a location and expressed as:

$$c(x,y)=b_c C(x,y)+d_C Y_{Average}(x,y)+h, \qquad \text{Eqn (4)}$$

where $Y_{Average}$ is the average luma value corresponding to the location (x, y), and $b_C$, $d_C$, and h may be transmitted in the bitstream 114 by the encoder 102.

Figure 5B:
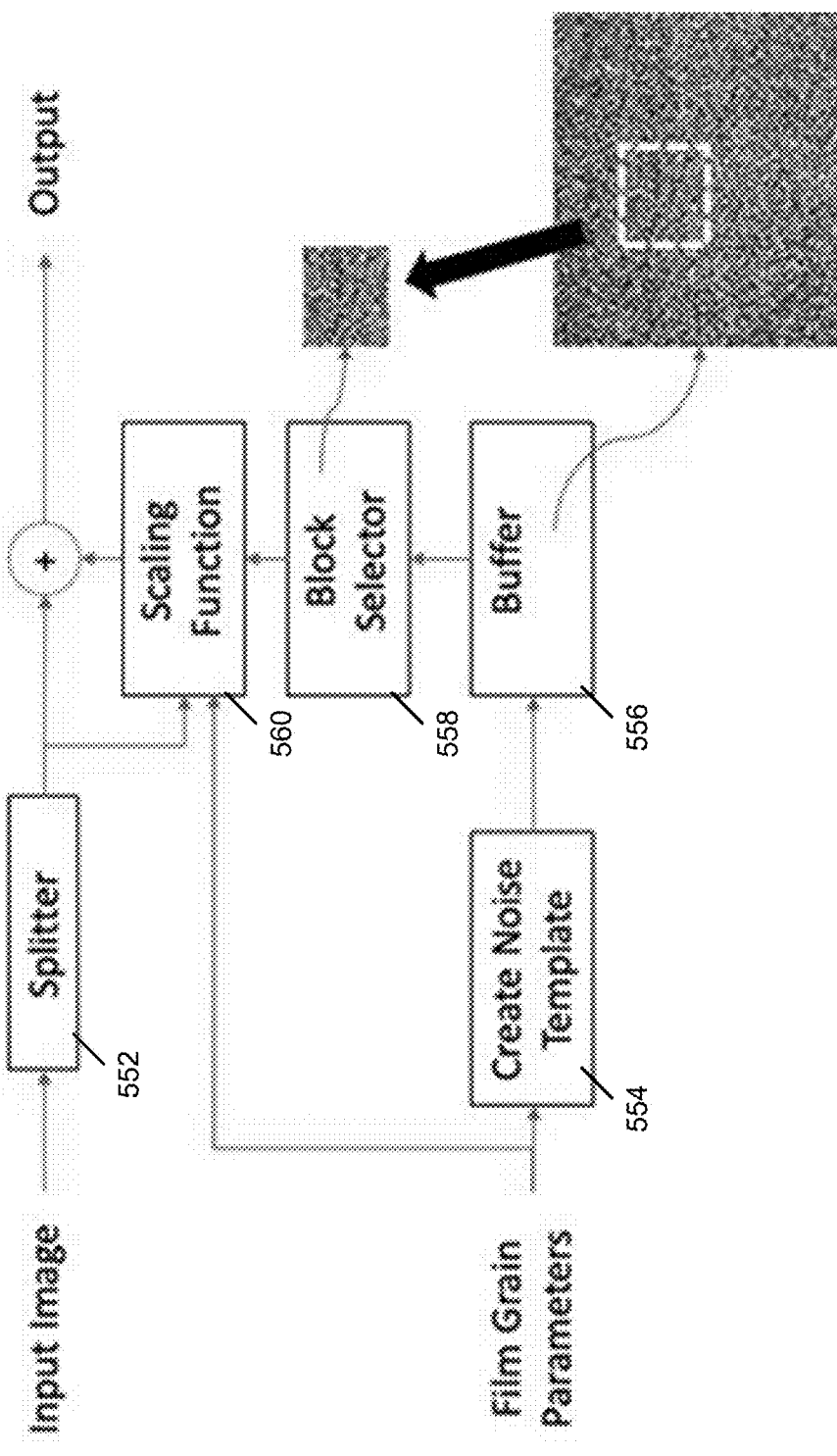
FIG. 5B illustrates a more detailed example of a film grain synthesis process, according to some embodiments.

FIG. 5B illustrates a more detailed example of a film grain synthesis process, according to some embodiments. The film grain synthesis process receives an image and film grain parameters as input. The input image is divided into blocks (e.g., 32×32 pixels) by a splitter 552. The film grain parameters are used to create a noise template 554 that has a larger size than the blocks (e.g., 64×64 pixels). The noise template is stored in a buffer 556. For each block, a region of the noise template is selected from the noise template by the block selector 558, and adjusted by a scaling function 556 based on the amplitude of the input block to generate the film grains. The generated film grains are then combined with the image blocks to generate an output image.

In some implementations, the noise template can be created using an autoregressive model to determine the AR coefficients described above. Gaussian noise corresponding to a Gaussian profile is generated, and the Gaussian noise is filtered with the AR coefficients to create the noise template for storing in buffer 556. In some implementations, the noise template can be signaled explicitly as an image. In such implementations, example noise is extracted by the encoder as an image. This image data is then coded using frequency transform, quantization, and entropy encoder operations (e.g., similar to blocks 210, 212 and 244 in FIG. 2). The decoder then receives the bitstream for the noise template and performs entropy decoding, dequantization and inverse frequency transform operations (e.g., similar to blocks 402, 404, 408 and 410 in FIG. 4). Accordingly, the noise template can be represented with an autoregressive model (e.g., a Gaussian noise profile) or represented with another approach (e.g., a frequency-based noise profile).

Figure 6:
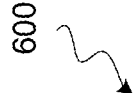
FIG. 6 shows an example flowchart for a method to generate a plurality of sets of film grain resolutions to be provided with an encoded video content, in accordance with some embodiments.
Figure 6:
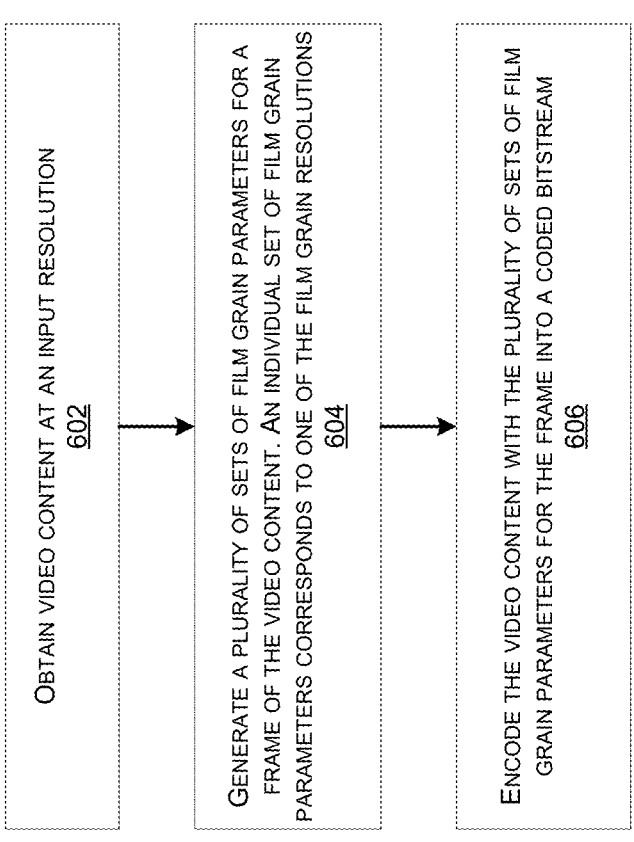

FIG. 6 shows an example flowchart 600 for a method to generate a plurality of sets of film grain resolutions to be provided with encoded video content, in accordance with some embodiments. The method may be performed, for example, by the encoder 102 or the encoder 200.

In step 602, the method may include obtaining video content at an input resolution. For example, the encoder 202 may receive the video content 202 at an input resolution of 1080p. The video content 202 may include film grains. For example, the film grains in the video content 202 may follow a Gaussian distribution as described with reference to FIG. 3.

In some embodiments, the method may further include resampling the video content at a plurality of film grain resolutions. The encoder 200 may resample the video content 202 at two different film grain resolutions, e.g., 720p and 480p, to generate encoded video content at different resolutions.

In step 604, the method may further include generating a plurality of sets of film grain parameters for a frame of the video content. Each (or an individual) set of film grain parameters for the frame may correspond to one of the film grain resolutions. Each set of film grain parameters may be generated by denoising the video content, and comparing the denoised video content with the video content to derive a Gaussian noise profile. For example, the video content 202 may be denoised by the denoiser 202 to remove the film grain, and the film grain modeling module 206 may generate a set of film grain parameters based on the extracted film grain properties from the denoising process. In some examples, a different set of film grain parameters may be generated for each film grain resolution by denoising the corresponding resampled video content. For example, a first set of film grain parameters may correspond to a film grain resolution of 720p, and a second set of film grain parameters may correspond to a film grain resolution of 480p.

As described with reference to Table 1, the apply_decoder_resolution_flag may have a value of 0 in the first set of film grain parameters to indicate that the first set of film grain parameters include the film grain resolution of 720p represented by the horizontal film grain resolution and the vertical film grain resolution. Similarly, the apply_decoder_resolution_flag may have a value of 0 in the second set of film grain parameters to indicate that the second set of film grain parameters include the film grain resolution of 480p represented by the horizontal film grain resolution and the vertical film grain resolution.

In step 606, the method may further include encoding the video content with the plurality of sets of film grain parameters for the frame into a coded bitstream. For example, the encoder 200 may encode the video content 202 or the resampled video content with the 2 sets of film grain parameters for the frame. In some embodiments, the video content 202 may be encoded with the 2 sets of film grain parameters for the frame into the coded bitstream 248 for transmission to the decoder 400. As described with reference to Table 4 and Table 5, the 2 sets of film grain parameters can be signaled in the ITU-T T.35 payload, and the parameter num_film_grain_sets_minus1 can be set to 1 indicating that 2 sets of film grain parameters are being provided. The coded bitstream 248 may also include the frame resolution of the video content 202, which may or may not be the same as any of the film grain resolutions provided in the set of film grain parameters.

Figure 7:
FIG. 7 shows an example flowchart for a method to apply film grain synthesis to a decoded frame based on a film grain resolution received with the coded bitstream, in accordance with some embodiments.
Figure 7:
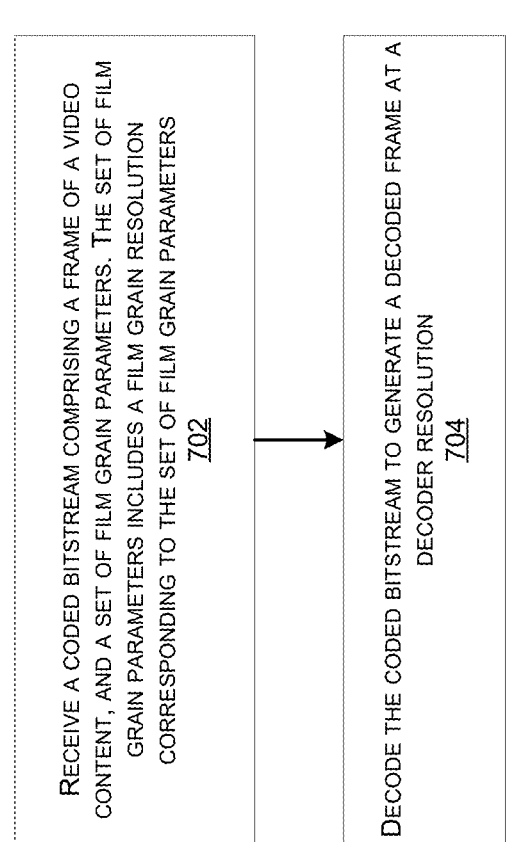

FIG. 7 shows an example flowchart 700 for a method to apply film grain synthesis to a decoded frame based on a film grain resolution received with the coded bitstream, in accordance with some embodiments. For example, the method may be performed by the decoder 108, or the receiving device 104.

In step 702, the method may include receiving a coded bitstream comprising a frame of video content, and a set of film grain parameters for the frame. The set of film grain parameters may include a film grain resolution corresponding to the set of film grain parameters. For example, the decoder 400 may receive the coded bitstream 248 comprising the encoded video content and the set of film grain parameters 250. As an example, the set of film grain parameters 250 may include a film grain resolution of 720p corresponding to the set of film grain parameters.

In step 704, the method may further include decoding the coded bitstream to generate a decoded frame at a decoder resolution. The decoder resolution may represent the resolution of the decoded frame, and may or may not change per frame. The decoder 400 may decode the coded bitstream 248 to generate the decoded frame 436 at the decoder resolution of 480p. The entropy decoder 404 of decoder 400 may also provide the control information 406 including set of film grain parameters and the film grain resolution of 720p to post-processor 500. Furthermore, the control information 406 may also include the decoder resolution of 480p. In some implementations, the set of film grain parameters 250 comprising the film grain resolution may be provided to another device for inserting the film grain into the decoded frame based on the set of film grain parameters 250. For example, the set of film grain parameters 250 may be provided to the post-processor 500.

The set of film grain parameters may be applied to the decoded frame by the post processor 500 to generate an output frame containing film grains. For example, the selection module 502 of the post-processor 500 may compare the film grain resolution of 720p with the decoder resolution of 480p, and select the film grain resolution of 720p to be used for applying the film grain synthesis. In some examples, the scaling module 504 may upsample the decoded frame 436 to the film grain resolution of 720p to generate an upsampled decoded frame, and the film grain synthesis module 506 may insert the film grains into the upsampled decoded frame using the set of film grain parameters to generate the output frame 508 containing the film grains at the resolution of 720p. If the display resolution is 1080p, the scaling module 504 may further upsample the upsampled decoded frame containing the film grains to the display resolution of 1080p.

In other examples, if the display resolution is 1080p, the scaling module 504 may upsample the set of film grain parameters corresponding to the film grain resolution of 720p to the display resolution of 1080p, and upsample the decoded frame to the display resolution of 1080p. The film grain synthesis module 506 may insert the film grains into the upsampled decoded frame using the upsampled set of film grain parameters to generate the output frame 508 at the resolution of 1080p. In some examples, the set of film grain parameters can be upsampled to 1080p by interpolating the set of film grain parameters to the display resolution of 1080p. For example, the set of film grain parameters can be upsampled by interpolation of the AR coefficients.

Thus, the techniques described herein can be used to decouple the signaling of the film grain resolution from the resolution of the underlying video frame. As described previously with reference to AV1 standard, syntax for some of the existing video codec standards can be modified to include the signaling of the film grain resolution corresponding to a set of film grain parameters, as well as signaling of a plurality of sets of film grain parameters corresponding to different film grain resolutions. Various embodiments can be used to signal different film grain resolutions in a bitstream, each with a corresponding set of film grain parameters, which can provide support for different decoders with varying capabilities.

Figure 8:
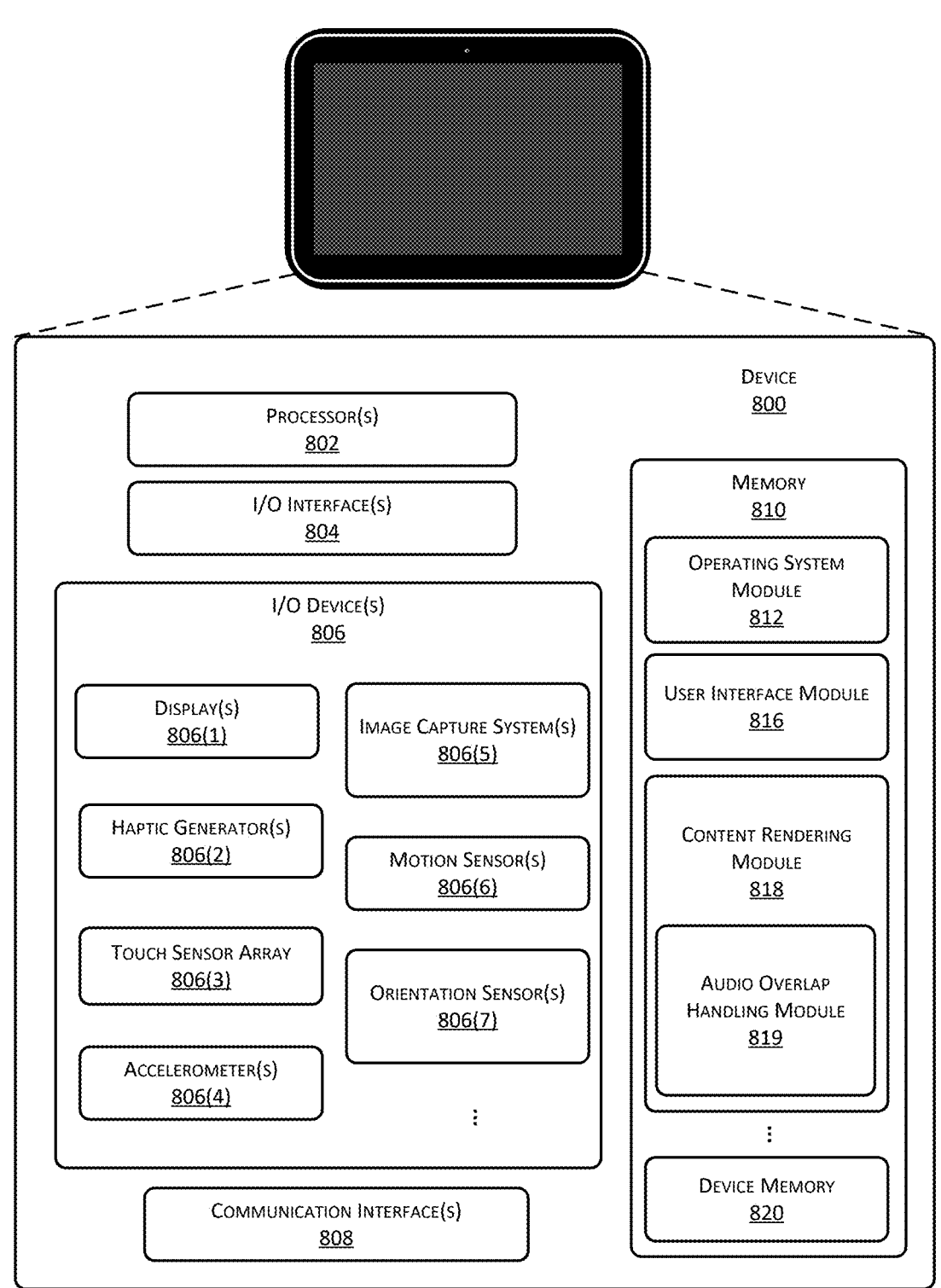
FIG. 8 is a block diagram of an example of a user device suitable for use with various embodiments discussed herein.

FIG. 8 is a block diagram of an example of a user device 800 suitable for use with various embodiments discussed above. User device 800 can be an example of a receiving device. As alluded to above, it should be understood that user device 800 may be any of a wide variety of device types. In some embodiments, user device 800 (depicted as a tablet device) may include one or more single or multi-core processors 802 configured to execute stored instructions (e.g., in device memory 820). User device 800 may also include one or more input/output (I/O) interface(s) 804 to allow the device to communicate with other devices. I/O interfaces 804 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 804 may be coupled to one or more I/O devices 806 which may or may not be integrated with client device 800.

User device 800 may also include one or more communication interfaces 808 configured to provide communications between the device and other devices. Such communication interface(s) 808 may be used to connect to cellular networks, personal area networks (PANs), local area networks (LANs), wide area networks (WANs), and so forth. For example, communications interfaces 808 may include radio frequency modules for a 3G, 4G, or 5G cellular network, a WiFi LAN and a Bluetooth PAN. User device 800 may also include one or more buses or other internal communications hardware or software (not shown) that allow for the transfer of data and instructions between the various modules and components of the device.

User device 800 may also include one or more memories (e.g., memory 810). Memory 810 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 810 may provide storage for computer readable instructions, data structures, program modules and other data for the operation of user device 800. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 810 may include at least one operating system (OS) module 812 configured to manage hardware resources such as I/O interfaces 804 and provide various services to applications or modules executing on processor(s) 802. Memory 810 may also include a user interface module 816, a content rendering module 818, and other modules. Memory 810 may also include device memory 820 to store a wide variety of instructions and information using any of a variety of formats including, for example, flat files, databases, linked lists, trees, or other data structures. Such information includes content for rendering and display on display 806(1) including, for example, any type of video content.

In some embodiments, display 806(1) may be a screen configured to multiple independent interfaces or video players, and may be associated with the display device 106. In some embodiments, display 806(1) may include one or more external screens, for example, a first screen and a second screen configured to display primary content and secondary content.

In some embodiments, a portion of device memory 820 may be distributed across one or more other devices including servers, network attached storage devices, and so forth.

It will also be understood that user device 800 of FIG. 8 is merely an example of a device with which various implementations enabled by the present disclosure may be practiced, and that a wide variety of other devices types may also be used. The scope of this disclosure should therefore not be limited by reference to device-specific details.

Figure 9:
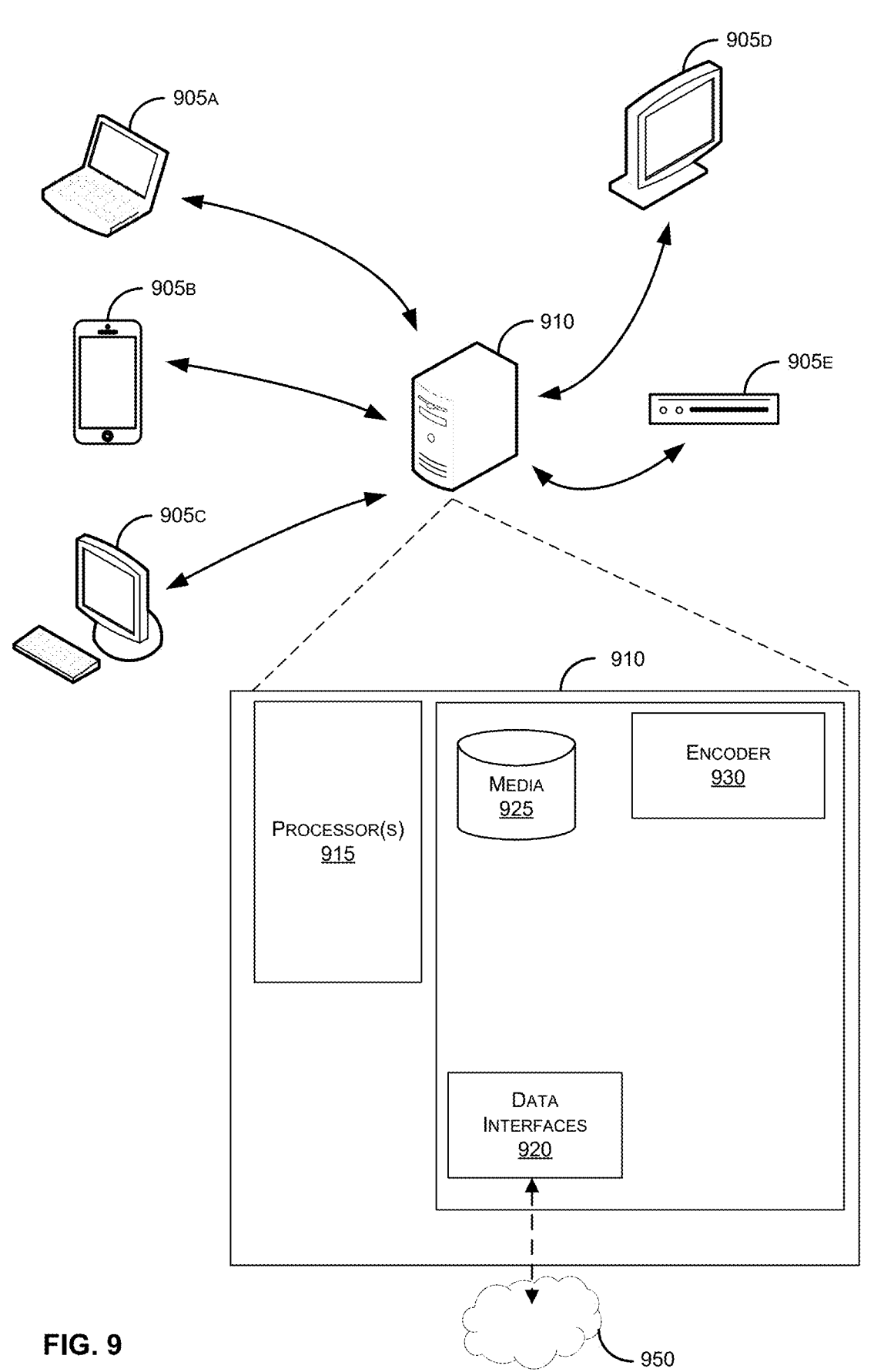
FIG. 9 is a block diagram of an example computing environment in which video data may be encoded, according to some embodiments.

FIG. 9 illustrates an example of a computing environment in which video data may be encoded, according to some embodiments. The computing environment of FIG. 9 includes a networked apparatus (e.g., server 910) which can be used to perform encoding on obtained video data, and provide encoded video data to computerized devices 905*a-e* (e.g., user devices, display devices).

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Server 910 may be part of a content delivery system that conforms to any of a wide variety of architectures. The functionality and components of media server 910 can use one or more servers and be deployed at one or more geographic locations (e.g., across different countries, states, cities, etc.) using a network 950 such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Server 910 can include one or more data interfaces 920 configured to perform data communication with the network 950, e.g., to receive video data from a video source, transmit live content (e.g., livestream content), or transmit encoded video data. Server 910 can include various types of logic used to provide media presentations for playback at devices 905*a-e*. In FIG. 9, server 910 includes storage 925 and can include one or more processors 915, memory, and other hardware for performing the tasks and logic disclosed herein. The storage 925 may store computer-readable and computer-executable instructions configured to, when executed by the one or more processors 915, cause the server 910 to perform operations as described herein (e.g., methodologies of FIG. 6 or 7). Storage 925 may also store a variety of media content (e.g., VOD content) for playback on devices 905*a-e*, such as episodes of television shows, movies, music, etc. Storage 925 can be a storage mechanism, such as a database. Server 910 also includes encoder 930. In some embodiments, the encoder 930 may be an example of the encoder 102 or encoder 200, and configured to perform operations as described with reference to FIG. 6.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIGS. 6 and/or 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A film grain synthesis system, comprising:
an encoder;
a decoder; and
a post-processor,
wherein the encoder is operable to:
    obtain video content at an input resolution;
    generate a plurality of sets of film grain parameters for an individual frame of the video content, wherein an individual set of film grain parameters for a frame corresponds to one of a plurality of film grain resolutions; and
    encode the video content with the plurality of sets of film grain parameters for the individual frame into a coded bitstream that includes a frame resolution of the video content and the plurality of film grain resolutions corresponding to the plurality of sets of film grain parameters;
wherein the decoder is operable to:
    decode the coded bitstream to generate a decoded frame at a decoder resolution and obtain the plurality of film grain resolutions from the coded bitstream; and
wherein the post-processor is operable to:
    select a film grain resolution having a highest resolution from the plurality of film grain resolutions; and
    apply a selected set of film grain parameters corresponding to the selected film grain resolution to the decoded frame to generate an output frame.

2. The film grain synthesis system of claim 1, wherein the decoder resolution is lower than the selected film grain resolution, and wherein applying the selected set of film grain parameters to the decoded frame includes:
    upsampling the decoded frame to the selected film grain resolution; and
    inserting film grains into the upsampled decoded frame using the selected set of film grain parameters.

3. The film grain synthesis system of claim 2, wherein the selected film grain resolution is lower than a display resolution, and wherein the upsampled decoded frame containing the film grains is further upsampled to the display resolution.

4. The film grain synthesis system of claim 1, wherein the selected film grain resolution is lower than a display resolution, and wherein applying the selected set of film grain parameters to the decoded frame includes:
    upsampling the decoded frame to the display resolution;
    interpolating the selected set of film grain parameters to the display resolution; and
    inserting film grains into the upsampled decoded frame using the interpolated set of film grain parameters.

5. A method comprising:
receiving a coded bitstream comprising a frame of video content and a frame resolution of the frame, and a set of film grain parameters for the frame, wherein the set of film grain parameters in the coded bitstream include a film grain resolution corresponding to the set of film grain parameters; and
decoding the coded bitstream to generate a decoded frame at a decoder resolution and obtain the film grain resolution from the coded bitstream to generate an output frame containing film grains based on the film grain resolution.

6. The method of claim 5, wherein the set of film grain parameters is applied to the decoded frame to generate the output frame containing the film grains.

7. The method of claim 6, wherein the decoder resolution is lower than the film grain resolution, and wherein applying the set of film grain parameters includes:
    upsampling the decoded frame to the film grain resolution; and
    inserting the film grains into the upsampled decoded frame using the set of film grain parameters.

8. The method of claim 6, wherein applying the set of film grain parameters includes inserting the film grains into the decoded frame using the set of film grain parameters when the film grain resolution is within a threshold difference to the decoder resolution.

9. The method of claim 6, wherein the decoder resolution is different than the film grain resolution, and wherein applying the set of film grain parameters includes:

interpolating the set of film grain parameters to the decoder resolution; and inserting the film grains into the decoded frame using the interpolated set of film grain parameters when the film grain resolution is within a threshold difference to the decoder resolution.

10. The method of claim 6, wherein the set of film grain parameters is one of a plurality of sets of film grain parameters being received, an individual set of film grain parameters corresponding to a different film grain resolution, and wherein the set of film grain parameters being applied to the decoded frame is selected from the plurality of sets of film grain parameters.

11. The method of claim 10, wherein the set of film grain parameters selected from the plurality of sets of film grain parameters has a film grain resolution that is closest to the decoder resolution.

12. The method of claim 10, wherein the set of film grain parameters selected from the plurality of sets of film grain parameters has a highest film grain resolution, and wherein applying the set of film grain parameters to the decoded frame includes:

upsampling the decoded frame to the highest film grain resolution; and inserting the film grains into the upsampled decoded frame using the set of film grain parameters.

13. The method of claim 12, wherein the highest film grain synthesis resolution is determined using a vertical resolution.

14. The method of claim 12, wherein the highest film grain synthesis resolution is determined using a horizontal resolution.

15. The method of claim 10, wherein the set of film grain parameters selected from the plurality sets of film grain parameters has a film grain resolution that is lower than a display resolution, and wherein applying the set of film grain parameters includes:

upsampling the set of film grain parameters to the display resolution;

upsampling the decoded frame to the display resolution; and inserting the film grains into the upsampled decoded frame using the upsampled set of film grain parameters.

16. The method of claim 10, wherein the set of film grain parameters selected from the plurality sets of film grain parameters has a film grain resolution that is lower than a display resolution, and wherein applying the set of film grain parameters includes:

upsampling the decoded frame to the film grain resolution;

inserting the film grains into the upsampled decoded frame using the set of film grain parameters; and further upsampling the upsampled decoded frame containing the film grains to the display resolution.

17. A method comprising:

obtaining video content at an input resolution;

generating a plurality of sets of film grain parameters for a frame of the video content, wherein an individual set of film grain parameters for the frame corresponds to one of a plurality of film grain resolutions; and encoding the video content with the plurality of sets of film grain parameters for the frame into a coded bitstream that includes a frame resolution of the video content and the plurality of film grain resolutions corresponding to the plurality of sets of film grain parameters.

18. The method of claim 17, wherein an individual film grain resolution is provided in the set of film grain parameters as a horizontal film grain resolution and a vertical film grain resolution.

19. The method of claim 17, wherein the coded bitstream includes a parameter indicating the number of sets of film grain parameters being provided.

20. The method of claim 17, wherein the individual set of film grain parameters is generated by:

denoising the video content; and comparing the denoised video content with the video content to derive a Gaussian noise profile.

21. The method of claim 17, further comprising:

resampling the video content at the plurality of film grain resolutions.

22. The method of claim 17, wherein the video content is encoded with the plurality of sets of film grain parameters for the frame into the coded bitstream for transmission to a decoder.

* * * * *